US010178863B2

(12) United States Patent
Schnaider et al.

(10) Patent No.: US 10,178,863 B2
(45) Date of Patent: Jan. 15, 2019

(54) POSITIONING SYSTEM FOR A SPRAYER BOOM

(71) Applicant: NORAC Systems International Inc., Saskatoon (CA)

(72) Inventors: James Schnaider, Saskatoon (CA); Jeff Cunningham, Saskatoon (CA)

(73) Assignee: NORAC Systems International Inc. (CA)

( * ) Notice: Subject to any disclaimer, the term of this patent is extended or adjusted under 35 U.S.C. 154(b) by 414 days.

(21) Appl. No.: 14/854,838

(22) Filed: Sep. 15, 2015

(65) Prior Publication Data

US 2016/0081321 A1    Mar. 24, 2016

(30) Foreign Application Priority Data

Sep. 19, 2014    (GB) .................................. 1416554.2

(51) Int. Cl.
| | |
|---|---|
| *A01M 7/00* | (2006.01) |
| *A01C 23/04* | (2006.01) |
| *B05B 1/20* | (2006.01) |
| *B05B 13/00* | (2006.01) |
| *B05B 15/06* | (2006.01) |

(Continued)

(52) U.S. Cl.
CPC ......... *A01M 7/0057* (2013.01); *A01C 23/047* (2013.01); *A01M 7/0053* (2013.01); *A01M 7/0075* (2013.01); *B05B 1/205* (2013.01); *B05B 13/005* (2013.01); *B05B 15/65* (2018.02); *F15B 11/16* (2013.01)

(58) Field of Classification Search
CPC . A01C 23/047; A01M 7/0053; A01M 7/0075; A01M 7/0057; F15B 11/16

USPC .......... 280/5.508; 60/484, 420, 403; 91/420; 248/70; 180/420; 239/1
See application file for complete search history.

(56) References Cited

U.S. PATENT DOCUMENTS 3,605,928 A * 9/1971 Loesch .................. B62D 12/02
137/899
3,752,497 A * 8/1973 Enke .................. B60G 17/0152
280/5.505

(Continued)

FOREIGN PATENT DOCUMENTS

| FR | 2813212 A1 | 3/2002 |
|---|---|---|
| SU | 1329729 A2 | 8/1987 |
| WO | 2004081499 A2 | 9/2004 |

OTHER PUBLICATIONS

Search Report dated Mar. 12, 2015, in connection with United Kingdom Patent Application No. 1416554.2, 4 pgs.

(Continued)

*Primary Examiner* — Dwayne J White
*Assistant Examiner* — Richard Drake
(74) *Attorney, Agent, or Firm* — Chiesa Shahinian & Giantomasi PC

(57) ABSTRACT

A positioning system, for a boom having right and left boom arms, comprises: a first actuator for moving the right boom arm relative to a support frame; a second actuator for moving the left boom arm relative to a support frame; a first hydraulic link between the first and second actuators; and a hydraulic control device for controlling movement of hydraulic fluid within the first hydraulic link, thereby controlling extension and/or retraction of the first and second actuators.

18 Claims, 8 Drawing Sheets

(51) Int. Cl.
*F15B 11/16* (2006.01)
*B05B 15/65* (2018.01)

(56) References Cited

U.S. PATENT DOCUMENTS

| | | | | |
|---|---|---|---|---|
| 4,213,511 A | * | 7/1980 | Rubenstein | B60T 13/16 |
| | | | | 180/420 |
| 4,288,034 A | * | 9/1981 | Widmer | A01M 7/0075 |
| | | | | 239/159 |
| 4,394,968 A | | 7/1983 | Tyler | |
| 4,598,830 A | | 7/1986 | Fletcher | |
| 4,940,106 A | * | 7/1990 | Pedersen | B62D 12/00 |
| | | | | 180/418 |
| 5,507,435 A | * | 4/1996 | Benest | A01M 7/0057 |
| | | | | 239/1 |
| 5,794,852 A | | 8/1998 | Wald et al. | |
| 6,834,223 B2 | * | 12/2004 | Strelioff | A01M 7/0057 |
| | | | | 239/167 |
| 7,431,309 B2 | * | 10/2008 | Kobayashi | B60G 17/0152 |
| | | | | 280/6.159 |
| 7,584,812 B2 | * | 9/2009 | Radke | B60G 17/005 |
| | | | | 180/9.5 |
| 7,849,686 B2 | * | 12/2010 | Nielsen | F15B 11/003 |
| | | | | 60/403 |
| 7,896,125 B2 | * | 3/2011 | Ivantysynova | F04B 49/002 |
| | | | | 180/418 |
| 2004/0158381 A1 | | 8/2004 | Strelioff et al. | |
| 2007/0289438 A1 | | 12/2007 | Thompson et al. | |
| 2009/0140501 A1 | * | 6/2009 | Taylor | B60G 21/06 |
| | | | | 280/5.508 |
| 2009/0173802 A1 | | 7/2009 | Theeuwen et al. | |
| 2010/0044124 A1 | * | 2/2010 | Radke | B60G 17/005 |
| | | | | 180/9.54 |
| 2014/0048368 A1 | | 2/2014 | Maagaard | |
| 2014/0074360 A1 | | 3/2014 | Rosa et al. | |
| 2014/0232082 A1 | * | 8/2014 | Oshita | B60G 17/0162 |
| | | | | 280/124.161 |
| 2014/0277676 A1 | | 9/2014 | Gattis et al. | |

OTHER PUBLICATIONS

Extended Search Report dated Feb. 11, 2016, in connection with European Patent Application No. 15185549.1, 7 pgs.

* cited by examiner

POSITIONING SYSTEM FOR A SPRAYER BOOM

REFERENCE TO PRIOR APPLICATION

This application claims the benefit of United Kingdom Patent Application No. 1416554.2, filed Sep. 19, 2014, the disclosure of which is herein incorporated by reference.

FIELD OF INVENTION

This invention relates to positioning systems suitable for use with a sprayer boom.

BACKGROUND

Boom Sprayers, Disturbances and Related Problems

Suspended boom sprayers are commonly used in agriculture in order to apply materials such as pesticides, herbicides and fertilizers over a wide swathe of land. FIG. 1 shows a schematic representation of the components commonly found in a sprayer boom 10, including the two boom wings 11, 12, a centre frame 13 to which the boom wings are connected, and a vehicle frame 14 to which the centre frame is attached. Common sprayer boom designs use a boom centre frame with wings suspended from each side. The wings of variable geometry booms can be adjusted upward or downward with using one or more hydraulic actuators 15, each wing pivoting from a hinge point 16 connection to the centre frame. These booms may also be folded inward for transport with hydraulic actuators, pivoting each wing about a vertical axis.

In order to efficiently cover a large swathe of ground, it is advantageous to use boom sprayers with long wings. The boom wings from which the materials are sprayed can often extend to more than 22 m from the chassis of a vehicle upon which the boom is mounted.

As a result of this large distance, a small rotation of the chassis can cause a significant movement of the ends of the boom wings.

A first problem this results in is that the spray tips deviate from their intended location, which can cause the spray to be applied unevenly across the field; there is also a possibility of the boom wings crashing into the ground or another obstacle.

A second problem is that the acceleration required to move the ends of the boom wings produces large stresses along the length of the wings, which can damage or break them.

It is therefore necessary for vehicles with long sprayer booms to include a means of mitigating the effects of chassis rotation on the position of the boom wings. This is typically achieved using a suspension system, a positioning system, or a combination of the two.

Rotational movement of the boom is usually described in terms of roll, yaw and pitch, which correspond to rotation around three different axes. For the purposes of the present invention, pitch motion is less important than roll and yaw so will not be considered.

Rolling movement corresponds to a rotation around an axis parallel to the direction that the vehicle travels in. In some designs this can occur when the wheels on only one side of the vehicle travel over a bump in the ground or when spraying a sloped field. The extent to which this effect is seen will be dependent upon many factors such as the relative positions of the centre of gravity and the boom pivot point, as well as the sprayer chassis suspension, tires, chassis flex and so on. Rolling rotation causes up-down movement of the boom wings and therefore creates a significant risk of damage to the boom from striking the ground as well as resulting in uneven spray application.

Yawing movement corresponds to rotation around a vertical axis and occurs when the vehicle turns. This causes a forward-back motion of the boom wings, which is unlikely to result in the wings striking the ground but still produces large stresses and causes uneven chemical application.

The effect of boom yaw may also transfer into a boom roll component, and the effect of boom roll may also transfer into a boom yaw component.

From now onwards rolling and yawing motion will be treated as interchangeable, unless they are specifically described as otherwise, with the described displacements being applicable to rotations around either of the relevant axes.

Boom Sprayer Suspension

An important aspect of sprayer design is a suspension that uncouples the spray boom from the chassis to provide a uniform spray distribution. These systems reduce the effect of input disturbances on the boom such as field bumps causing chassis roll, or steering/tracking input producing chassis yaw, which affect boom stability and consequently application performance.

When a spray vehicle is driving over uneven terrain, any disturbances will usually be imparted to the vehicle through its wheels, and must then be transmitted through a number of elements before reaching the boom wings. There are, therefore, a number of different locations at which the individual boom wings may be uncoupled from an outside disturbance input.

FIG. 2 shows a schematic diagram of a very general suspension system in which each of the main elements of a boom sprayer vehicle is uncoupled to some extent from its surrounding components by use of parallel spring and damping components. In FIG. 2:

Level inclination/reference distance 20 is the distance from a specified reference point, which could, for certain systems, be the horizontal plane normal to gravity.

The disturbance input 21 is the effect between the ground and vehicle tires, such as a bump beneath a wheel 22 and 23 are the spring and damping system component of the tires and axle suspension 24 is the rotational inertia of the sprayer chassis 25 is the support frame of the boom suspension 26 is the hydraulic actuator between the support frame 25 and Intermediate frame 27 which will exist in some common designs 28 and 29 are the spring and damper components of a pivoting boom suspension system. The spring and damper locations can be reversed without affecting the operation of the system, and the suspension (spring damper) and roll actuator can be reversed as well.

30 is the boom frame 31 is the pendulum centring force applied to the boom frame. This is likely not applicable for yaw suspension systems because boom yaw is not typically affected by gravity 32 is the rotational inertia of boom frame, which is typically small in comparison to the left and right wings 40 and 50 are the hydraulic actuators that connect between the boom center frame 30 and the left and right wing boom section. These are normally used to adjust the position of the wings 11, 12 with respect to the center frame to follow changing terrain

41 and 51 represent the rotational inertia of the left and right boom wings 11, 12, respectively

42 and 52 are the spring components of the left and right wing independent suspension (these components are not present in all boom designs)

43 and 53 are the damping components of the left and right wing independent suspension (these components are not present in all boom designs)

33 and 34 are the spring and damper for a linked boom roll suspension (if applicable).

Suspension elements 28, 29 and 33, 34 are not likely to occur in the same system because they are basically redundant. 28/29 is found in a pivoting suspension, where 33/34 is found in a linked suspension.

Most common suspension designs usually include some but not all of these components.

The pendulum centering force 31, for instance, is due to gravity and may be found in roll suspension systems but is unlikely to be applicable to a yaw suspension system. In a roll suspension system, such a term would depend on the centre of gravity of the boom wings and the location of their pivot points. Not all roll suspension systems will have this term.

Pivoting Boom Suspension

Pivoting centres allow the boom (boom wings and centre frame) to roll as one assembly with respect to the chassis. The boom may rotate on a single bearing point, on a set of linkages which create a virtual pivot point, or a combination of multiple pivot points (for example a bearing point and a virtual point). These designs may use spring and dampers and/or, in the case of rolling motion, the pendulum centring effect of gravity to steady the boom. In such a system the spring and damping components 28/29 shown in FIG. 2 act to uncouple the boom frame body, 32, from the chassis body, 24.

Linked Boom Suspension

The effect of a pivoting centre can be simulated by forcing one wing of the boom to raise as the other lowers using a mechanical link between the two wings, such as a rigid bar connecting points on both wings. This requires that the connection between the wings and the boom centre frame include a pivot point. As one wing is raised and the other lowers, it simulates the effect of a pivoting boom (as described in the previous section) although during this time the centre frame is stationary. This design is similar to part of U.S. Pat. No. 5,794,852A. These designs use a combination of springs and dampers and/or, in the case of rolling motion, the pendulum effect of gravity to steady the boom. In such a system the damping 34 and spring 33 components shown in FIG. 3 act to uncouple the boom wings, 41 and 51, from the centre frame, 32, with the boom wings remaining mechanically coupled to one another.

Independent Boom Suspension

Independent suspension between each wing and the centre frame is possible using a mechanical or hydraulic suspension. This is useful for limiting dynamic loads reducing the risk of structural damage while providing a small amount of roll/yaw isolation from the chassis to the spray boom wings.

This type of suspension can be found on its own or in conjunction with a pivoting or linked centre frame design. Unlike a pivoting or linked suspension system this type of suspension does not prevent both boom wings from moving in the same direction simultaneously. This in-phase displacement can cause the spray height to vary across the width of the boom from a vertical disturbance input. More ideal vertical boom suspension designs suspend the entire boom assembly preventing the change in boom geometry and variation in spray height during a suspended deflection. These types of vertical suspension are detailed in numerous patents.

Because independent suspension responds to both chassis roll/yaw and linear disturbances its effectiveness is often limited; to provide a reasonable amount of roll/yaw isolation the suspension properties would affect vertical displacement performance making the boom less useable. A more ideal solution would be separate suspension systems to manage each type of input disturbance (roll/yaw input, linear input) separately.

A new boom positioning system is proposed, including a hydraulic link and a hydraulic control device for controlling movement of hydraulic fluid in the link, in order to control the boom in roll and yaw. Hydraulically linked suspension can be provided, wherein a simple hydraulic circuit may be integrated into a more complex system allowing for independent control of each arm; and the inclusion of active and passive suspension elements.

SUMMARY OF THE INVENTION

According to an aspect of the invention there is provided a positioning system for a boom having right and left boom arms, the system comprising: a first actuator for moving the right boom arm relative to a support frame; a second actuator for moving the left boom arm relative to a support frame; a first hydraulic link between the first and second actuators; and a hydraulic control device for controlling movement of hydraulic fluid within the first hydraulic link, thereby controlling extension and/or retraction of the first and second actuators.

The hydraulic control device may comprise a hydraulic drive which is arranged to displace the said hydraulic fluid within the first hydraulic link in order to control the said extension and/or retraction of the first and second actuators.

The first hydraulic link may comprise first and second link chambers, separated by a movable element which is arranged to be moved by the hydraulic drive in order to displace the said hydraulic fluid; the first and second link chambers being linked to the first and second actuators respectively, such that the position of the movable element controls the said extension and/or retraction of the first and second actuators.

The first hydraulic link and the hydraulic drive may comprise an integral unit, the hydraulic drive comprising first and second drive chambers, each of which is separated from a respective one of the first and second link chambers by the movable element; and providing a hydraulic fluid to one of the first and second drive chambers causes the said movement of the movable element, so as to provide the said displacement of hydraulic fluid, thereby to control the said extension and/or retraction of the first and second actuators.

The hydraulic drive may comprise a third actuator which is mechanically linked to the movable element. The third actuator may form a part of a rotary hydraulic system.

The first and second actuators may be linked by a second hydraulic link, such that as one actuator extends, the other retracts.

The first and second actuators may be linear actuators. Alternatively, the first and second actuators may be rotary actuators.

The boom may be mounted on a vehicle and the first and second actuators may rotate the boom wings around axes which are substantially parallel to the direction of travel of the vehicle. Or, the first and second actuators may rotate the boom wings around axes which are substantially vertical when the vehicle is on flat ground.

The first hydraulic link may comprise a hydraulic link element which is arranged in parallel with the hydraulic drive, such as to allow the first and second actuators to move under the influence of a sudden force, without movement of the movable element. The hydraulic link element may comprise third and fourth link chambers which are separated by a mechanical element, the third link chamber being linked to the first link chamber and to the first actuator, the fourth link chamber being linked to the second link chamber and to the second actuator; and the hydraulic link element may comprise a biasing element which biases the mechanical element towards a neutral position.

The hydraulic drive may comprise a flow metering system which is connected to the first hydraulic link.

According to another aspect of the invention there is provided a boom sprayer, comprising a positioning system as described hereinabove.

BRIEF DESCRIPTION OF THE FIGURES

Embodiments of the invention will now be described, by way of example, with reference to the accompanying Figures in which.

Mechanical diagrams are simple linear representations of rotational systems.

DETAILED DESCRIPTION OF THE FIGURES

The invention is described by reference to some comparative examples, which provide useful background and context for understanding the invention and may sometimes be used in combination with the invention.

Figure 4:
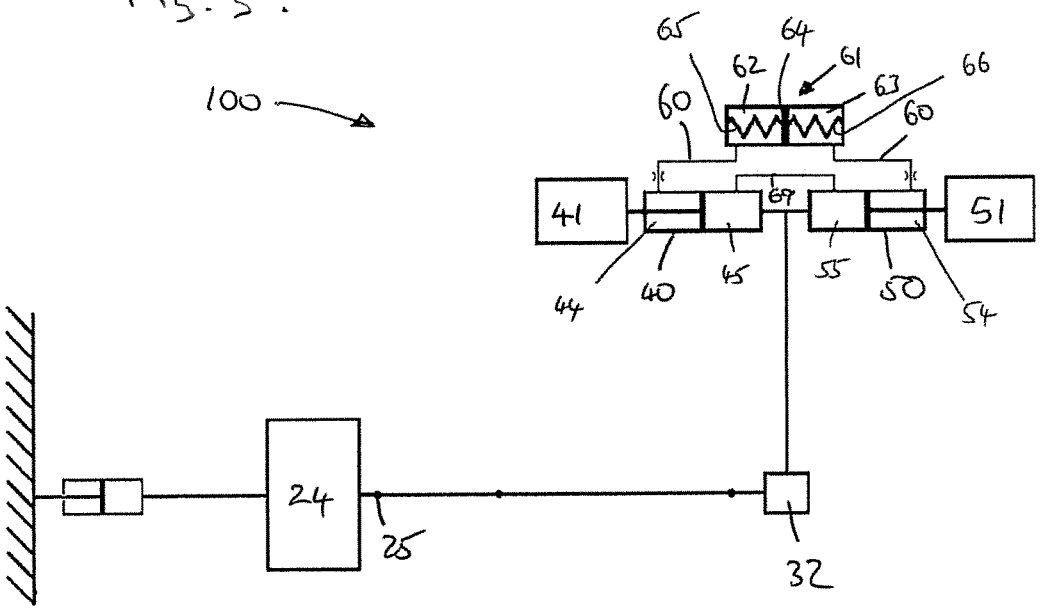
FIG. 4 shows a schematic mechanical system representation of a hydraulically linked suspension system of relevance to the present invention.

FIG. 4 shows a schematic view of one comparative example of a hydraulically linked boom suspension system 100.

Figure 1:
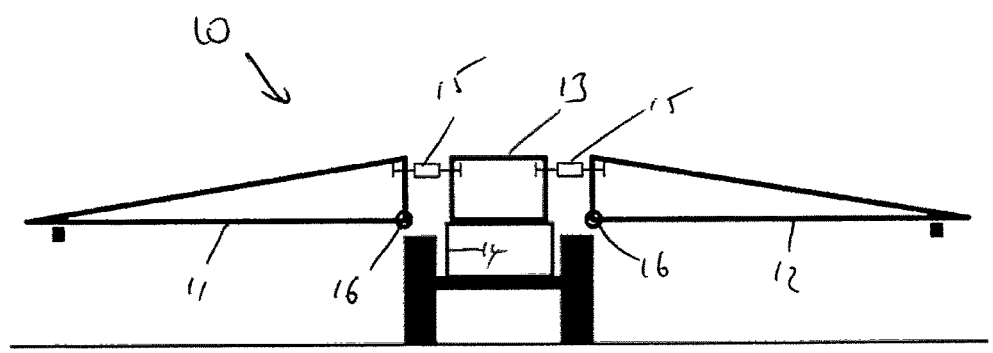
FIG. 1 shows a simple schematic diagram of a boom sprayer.
Figure 2:
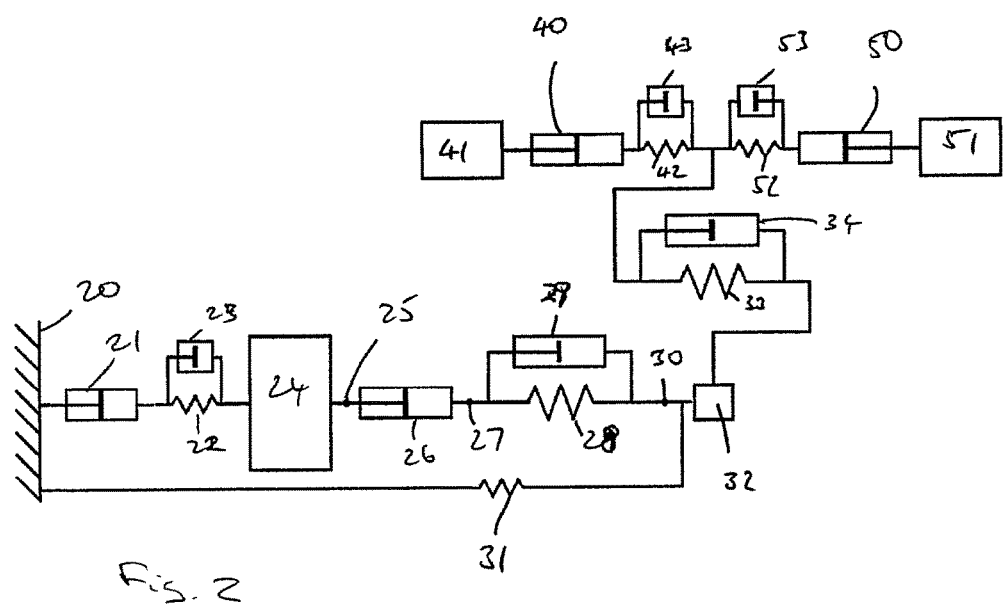
FIG. 2 shows a schematic mechanical system representation of a general boom sprayer suspension system including the elements found in most common suspension systems.
Figure 3:
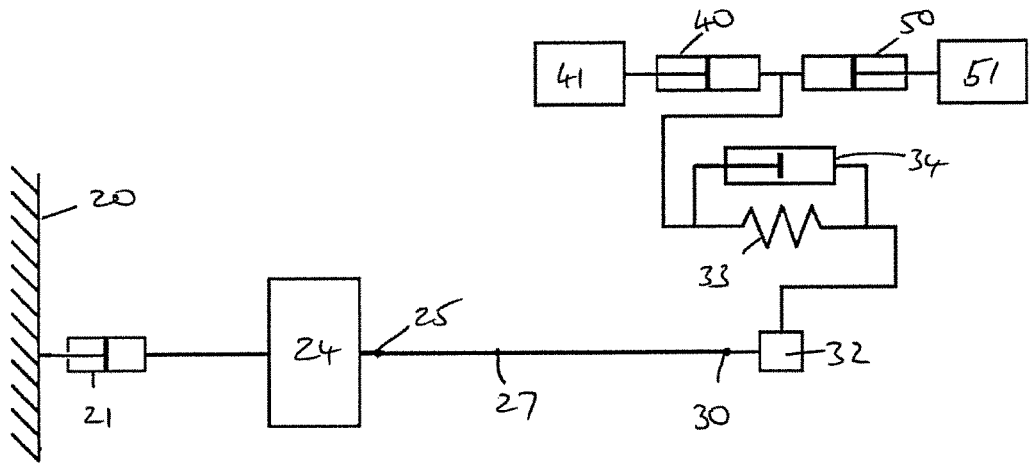
FIG. 3 shows a schematic mechanical system representation of a mechanically linked suspension system.

In this example, the main body of the chassis 24 is rigidly linked to the centre frame 32 of a spray boom. The centre frame 32 is then rigidly coupled to a first and a second actuator, 40 and 50, which determine the positions of the left and right wings, 41 and 51, of the boom assembly. In the case of a yaw suspension system the actuators rotate the wings forward or backwards about pivot points 16 (see FIG. 1) connecting them to the centre frame; in a roll suspension system the wings are rotated in a vertical plane.

Each hydraulic actuator 40, 50 is connected to the other via two hydraulic links 60, 69. The first hydraulic link 60 includes a biasing link element 61, which contains two chambers 62, 63. A front chamber 44, 54 in each of the actuators is connected to a separate chamber of the biasing link element. As hydraulic fluid is added to one of the chambers of the biasing link element, it must be removed from the other chamber; a second link 69 is thus formed, constraining the extensions of the two actuators.

Figure 12:
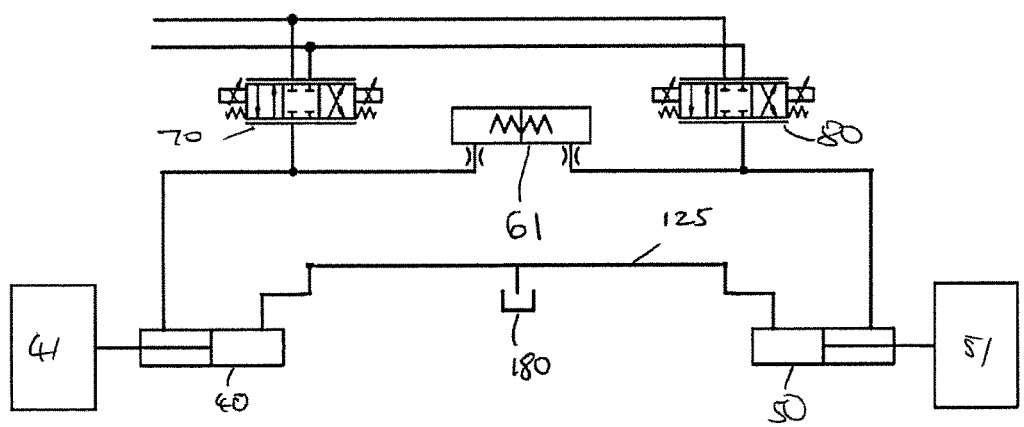
FIG. 12 shows a hydraulic schematic diagram of a hydraulic circuit in which the actuators are single acting and whose back chambers breathe oil.

The second hydraulic link 69 connects a back chamber 45, 55 of each of the two actuators, ensuring that the total volume of the two back chambers remains constant. As a result of this constraint, in order for one of the chambers to extend the other must have to retract. In certain embodiments, such as shown in FIG. 12, this link may be omitted, with each of the back chambers being open or connected to an air or oil bath, so as to freely "breathe" air or oil respectively; in such a case the extension of the actuators must be linked entirely through the other hydraulic link.

The two chambers of the biasing link element are separated by a mechanical element 64, which in this case is a moveable wall, the position of which determines (or is determined by) the volume of each of the chambers 62, 63. A biasing element 65, 66, which in this case is a biasing spring element, is located in each chamber 62, 63 and biases the moveable wall towards a neutral position, which in this case is at the centre of the biasing link element, and, thus, biases each of the actuators towards a neutral extension.

It is to be understood that the exact definition of the neutral position may depend on several factors, such as the symmetry of the boom system and biasing link element. However, in general the mechanical element will be in a neutral position before the input of a disturbance, whereupon it will be forced into a non-neutral position, causing a biasing element to bias the mechanical element towards the neutral position. In particular the neutral position is one in which the mechanical and/or hydraulic forces are in equilibrium, such that the boom wings are not moving.

When a boom sprayer vehicle using the suspension system of this kind receives a sudden disturbance, be that caused by uneven ground or from changing the direction of travel, the following sequence of event takes place. The disturbance is initially transmitted through the chassis 24 of the vehicle to the boom centre frame 32. The disturbance is then transmitted through the boom centre frame to the first and second actuators, 40 and 50. As the two actuators are able to extend and retract, the rotational inertia of both wings 41, 51 reduces their change of orientation as the boom centre frame rotates around them, i.e. one wing is raised and the other is lowered with respect to the boom arm. As one actuator retracts, the other actuator must extend, as hydraulic fluid is forced into one chamber of the biasing link element and displaced from the other chamber. This causes the moveable wall 64 to be moved from its neutral position and one of the biasing spring elements 65, 66 to exert a force tending to return the moveable wall to the neutral position.

If the disturbance is immediately removed, such as would be the case when travelling over a small bump in the ground or making a minor steering adjustment, the chassis then returns to its original position relative to the boom wings and the boom wings undergo very little movement. As the chassis returns to its original position relative to the boom wings, the actuators return to their original extensions and the moveable wall in the biasing link element returns to the centre.

If the disturbance persists, such as when the vehicle moves from a flat section of field to a sloped section of field or when the vehicle changes direction, the chassis remains tilted with respect to the boom wings. After this long-term disturbance, the moveable wall in the biasing link element is biased towards the neutral position, hydraulic fluid is gradually pushed out of one chamber and brought into the other until the moveable wall returns to the neutral position. This causes the first and second actuators, 40 and 50 to return to their original extension positions, which results in the left and right boom wings regaining their original orientation with respect to the vehicle chassis.

The timescale by which a persistent disturbance and an immediately removed disturbance may be defined depends on the stiffness of the biasing element.

In other comparative examples, such as where the first and second actuators 40, 50 are also independently controlled (see FIG. 6 as an example), the wall 64 might not return to a central position and the actuators might not return to their original extension positions, but instead return to an equilibrium position where a pressure difference in the two sides of the hydraulic link is balanced by the spring force. The equilibrium position may also be affected by non-symmetrical properties, such as a difference in size of the first and second actuators or a difference in mass of the right and left boom arms.

By choosing a spring element 65, 66 (or spring elements) of appropriate stiffness, the degree of uncoupling between the vehicle chassis and the boom wings can be chosen.

In other comparative examples, other suspension components may exist at different points in the circuit.

This invention would potentially be beneficial for sprayer boom designs which do not include roll or yaw suspension, but will likely include hydraulic wing tilt and/or fold actuators. The invention will be applicable to a linked suspension system requiring little or no mechanical modification. It can also be incorporated into other sprayer boom designs.

This system also has advantages over current mechanical suspension systems in that:

It uses the existing wing tilt pivot points and actuators, therefore reducing (perhaps eliminating) moving parts/point of wear surfaces The reduction in mechanical parts improves visibility through the boom structure, important for front-mounted booms The linkage may be easily locked by blocking the circuit rather than using a mechanical system (this is often a requirement for boom folding)

Figure 5:
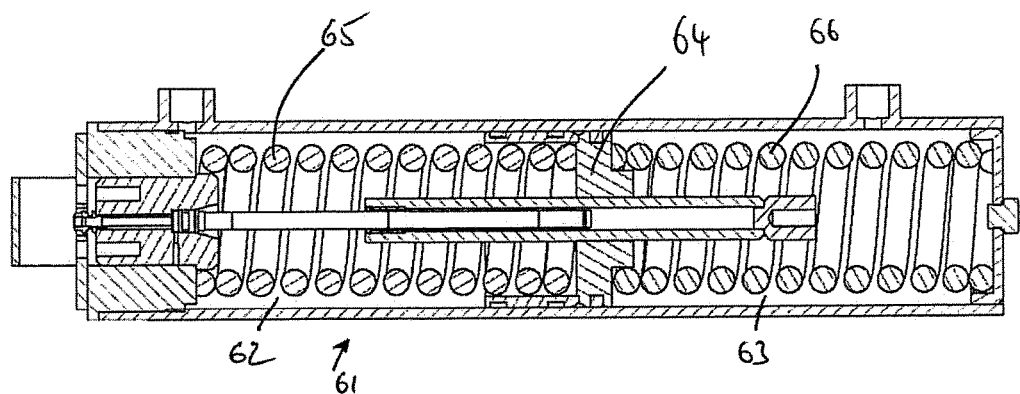
FIG. 5 shows a diagram of a biasing link element of relevance to the present invention.

FIG. 5 shows an example of a biasing link element 61, wherein the biasing element is a pair of springs 65, 66—the relative compression forces of the two springs urges the moveable wall towards a neutral, in this case central, position. In the case of the hydraulic fluid being at a greater pressure on one side of the moveable wall than the other, the equilibrium position will have one of the chambers having a greater volume than the other.

In some comparative examples, the biasing link element 61 may not include two chambers 62, 63 of variable volume, but may instead include a rotary actuator. In some comparative examples, the biasing element may not be a compressive spring, but may instead be a torsional spring or other suitable element. In some comparative examples, suitable only for roll suspension, the entire biasing link element may be omitted and a gravitational pendulum effect used instead to bias the wings towards a neutral position.

Figure 6:
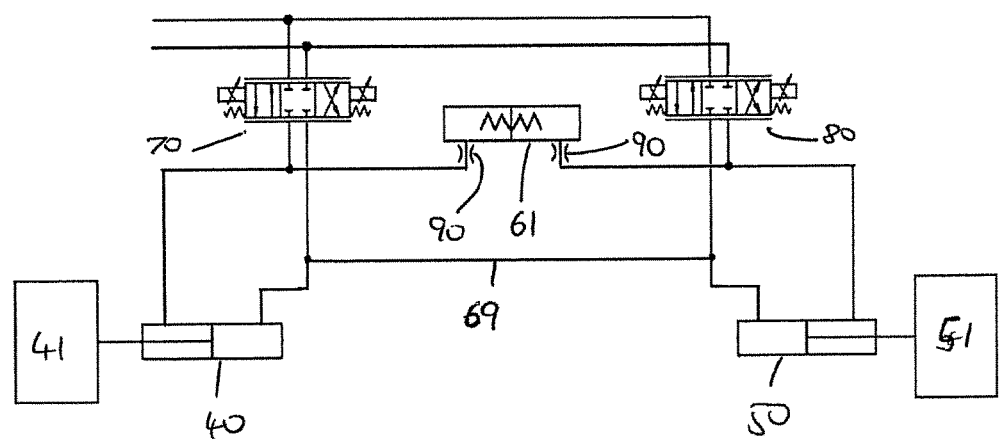
FIG. 6 shows a simplified hydraulic schematic diagram of the hydraulically-linked suspension system integrated into a typical left and right wing position control circuit of a variable geometry boom.

FIG. 6 shows a schematic diagram of the comparative example of FIG. 4 integrated into a typical left and right wing position control circuit of a variable geometry boom design, where:

70 is the existing control valve for the actuator 40 controlling the position of the left wing (41)

80 is the existing control valve for the actuator 50 controlling the position of the right wing (51)

The biasing link element 61 is connected hydraulically to the left and right wing control circuits, allowing hydraulic fluid to be transferred from one side to the other. This type of circuit has minimal effect on the independent operation of the left and right wing positioning control.

Damping orifices 90 are provided between the actuators 40, 50 and the respective chamber or the biasing link element 61. The damping may be provided by orifices, or by valves, or any other suitable damping device. Some form of damping is not essential, although can be beneficial depending upon the system characteristics that are required.

Figure 7:
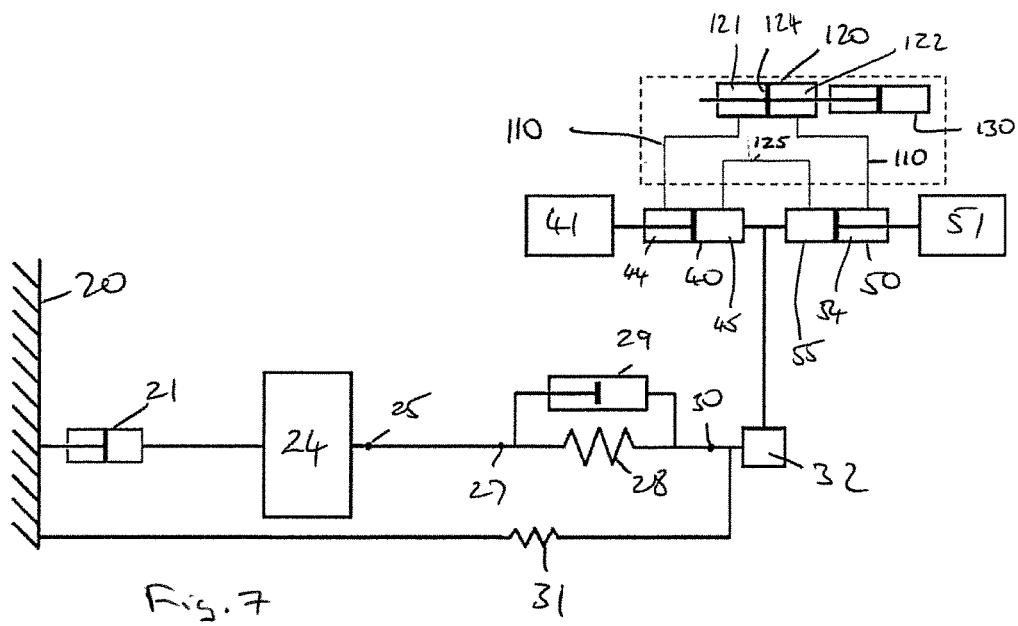
FIG. 7 shows a schematic mechanical system representation of a suspended boom position control system for a boom sprayer according to an embodiment of the present invention.

FIG. 7 shows a schematic diagram of an embodiment of a suspended boom position control system for a boom sprayer in accordance with the invention.

In this embodiment, the vehicle chassis is connected to the boom centre frame via a pivoting passive suspension system (28/29), providing the boom frame 30 with some freedom to rotate relative to the chassis frame 24. The boom frame is then linked to a first 40 and a second 50 actuator, which are themselves linked to right and left boom wings, 41 and 51.

Each hydraulic actuator 40, 50 is connected to the other via two hydraulic links. The first hydraulic link 110 includes a hydraulic link element 120, which may be similar to that shown in FIG. 5, but without the springs, which contains two chambers 121, 122. A front chamber 44, 54 in each of the actuators is connected to a separate chamber 121, 122 of the hydraulic link element. As hydraulic fluid is added to one of the chambers of the hydraulic link element, it must be removed from the other chamber; a second link 125 is thus formed, constraining the extensions of the two actuators.

The second hydraulic link connects a back chamber 45, 55 of each of the two actuators, ensuring that the total volume of the two back chambers remains constant. As a result of this constraint, in order for one of the chambers to extend the other must have to retract. In certain embodiments, similar to that shown in FIG. 12, this link may be omitted, with each of the back chambers being open or connected to an air or oil bath 180, so as to freely "breathe" air or oil; in such an embodiment the extension of the actuators must be linked entirely through the other hydraulic link.

The two chambers of the hydraulic link element are separated by a moveable element 124, in this case a movable wall, for displacing the hydraulic fluid in the chambers, the position of which determines the volume of the two chambers 121, 122 and which is determined by a third actuator, 130. Thus, as the hydraulic links 110, 125 between the first and second actuators, 40 and 50, constrains the actuators to extend and retract in opposite directions to one another, the third actuator 130 determines the absolute extension and retraction of the two actuators.

The third actuator 130 may be controlled either manually or by a computer implemented control system.

In other embodiments other suspension components may exist at different points in the circuit and the pivot suspension component may not be included.

Figure 8:
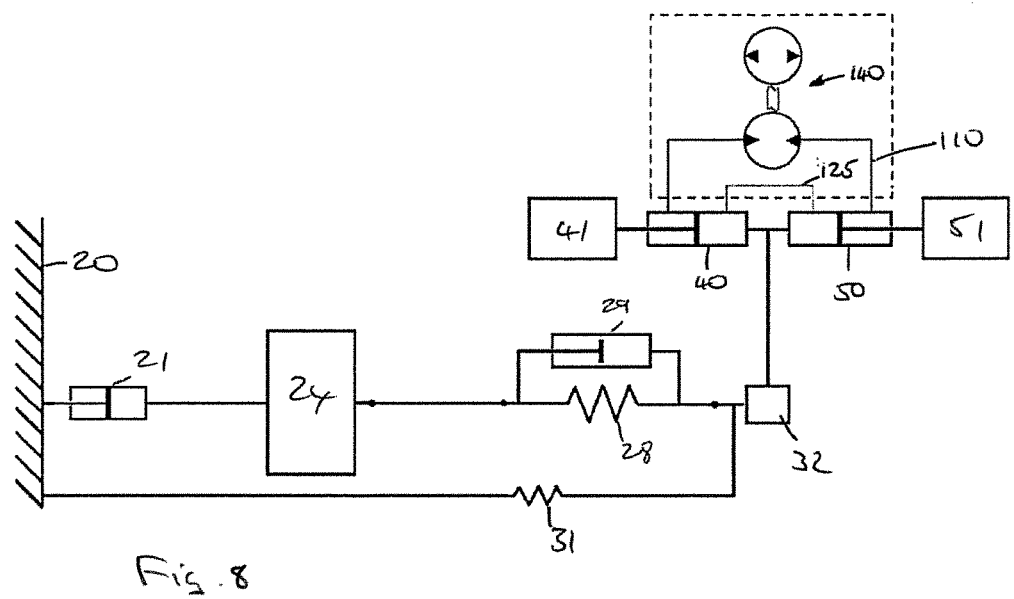
FIG. 8 shows a schematic mechanical system representation of a suspended boom position control system for a boom sprayer incorporating a rotary hydraulic system according to an embodiment of the present invention.

FIG. 8 shows a similar system to that of FIG. 7, wherein the hydraulic link element and the actuator have been replaced by a rotary hydraulic system 140 performing the same function.

The hydraulically-linked position control system is useful for providing the function of actuator 26 in mechanical systems where it is not usually offered or supported. By providing the function of the third actuator 130 in series with a passive suspension, it is possible to apply a system such as in NORAC Active Roll, wherein the third actuator is controlled according inputs from various position measurements. In NORAC U.S. Pat. No. 6,834,223 B2 control signals are used to determine hydraulic valve output magnitude and direction of an actuator that produces boom roll with respect to the support frame (chassis). This type of system is intended for automatic boom height control purposes where actuators 130, 40 and 50 are all automatically controlled. The present invention is applicable to systems having either automatic or manual control of the third actuator.

Figure 9:
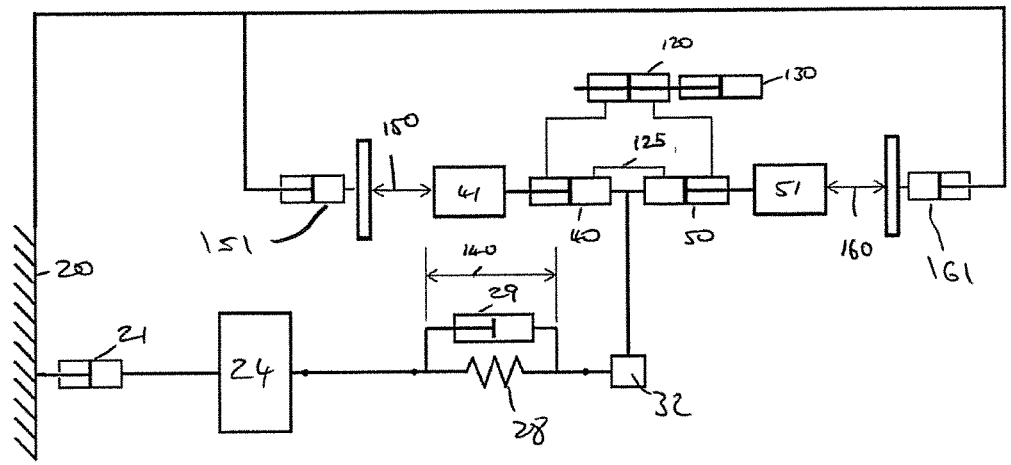
FIG. 9 shows a schematic mechanical system representation of a suspended boom position control system for a boom sprayer incorporating position measurement means.

FIG. 9 illustrates a typical pivoting boom suspension system with measurement signals suitable for use with a control system such as disclosed in U.S. Pat. No. 6,834,223 B2, where:
  140 is the spring target distance
  150 is the left wing target distance
  160 is the right wing target distance U.S. Pat. No. 6,834,223 B2 describes the ability of active roll logic to remove errors included by disturbances inputs through the vehicle and also to increase the rate of adjustment of the position of 41 and 51 to correct for changes in 150 and 160. The functionality of active roll logic using hydraulically-linked control is described in the following section.

In the event of a sudden disturbance input, the following sequence of events takes place. Initially, the vehicle chassis 24 is caused to move (roll or yaw) abruptly with respect to the reference point 20. The passive pivot suspension allows the boom centre frame to be deflected from the vehicle chassis due to its inertia. This deflection is measured by the deflection of 29/28 and is the spring target distance 140.

U.S. Pat. No. 6,834,223 B2 describes the use of the spring target distance signal, combined with the difference of the left wing 150 and right wing 160 signals (currently zero) to determine the direction and magnitude of the corrective action of third actuator 130.

In the invention the dynamic response of the actuation of third actuator 130 creates a force between the wing masses 41/51 and mass 32 which is consequently transmitted to damper 29 and spring 28. The controller's action of the third actuator 130 in this event is intended to minimize the deflection of 29/28, i.e. minimizing the spring target distance 140 therefore neutralizing the effect of the disturbance input on the wing position.

This type of automatic control provides stable boom behavior and uniform spray application.

Components 151 and 161 produce the effect of changes in terrain position with respect to the left and right boom wing 41 and 51, respectively. In the event of a target change input (left target change input via component 151 for example):

For simplicity assume that no input disturbance exists at this time. The change of the left wing 150 measurement causes the controller to respond by adjusting the position of 41 using actuator 40.

The rate of adjustment of actuator 40 may not be sufficient to manage the rate of the target change. In terms of actuator 40 providing a wing lift action, this may result in the misapplication of chemicals, or the left wing contacting the ground or crop causing damage. However, in the design of U.S. Pat. No. 6,834,223 B2 the difference between the measurements 150 and 160 produces a corrective action of third actuator 130 which will increase the rate of adjustment to reduce the difference between 150 and 160, improving chemical application and reducing the risk of boom damage.

Figure 10:
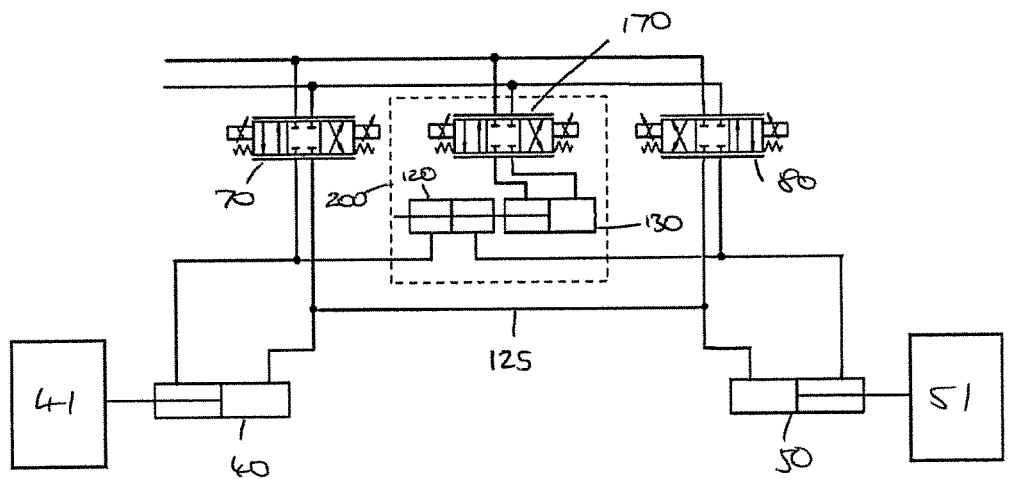
FIG. 10 shows a schematic mechanical system representation of a suspended boom position control system for a boom sprayer integrated into a typical left and right wing position control circuit of a variable geometry boom.

FIG. 10 illustrates a simple hydraulic schematic of the hydraulically-linked position control invention integrated into a typical left and right wing position control circuit of a variable geometry boom where:
  70 is the existing control valve for the actuator 40 controlling the position of the left wing (41)
  80 is the existing control valve for the actuator 50 controlling the position of the right wing (51)
  170 is the control valve for a third actuator 130 which drives the linked wing control circuit by biasing the pressure difference between the left and right wing 40, 50 circuit.

Figure 10A:
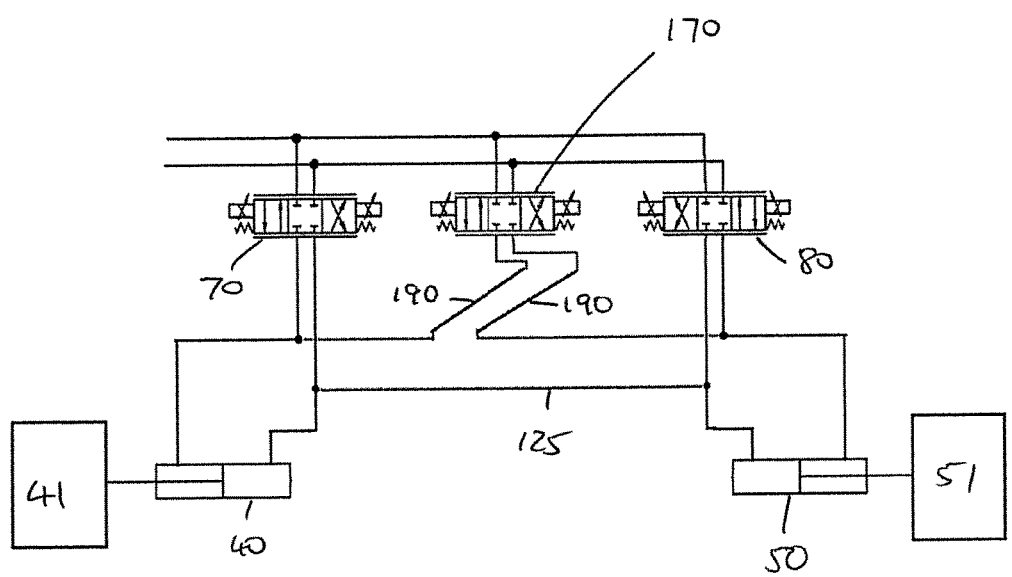
FIG. 10a shows a schematic mechanical system representation of an alternative suspended boom position control system for a boom sprayer integrated into a typical left and right wing position control circuit of a variable geometry boom.

FIG. 10a shows an alternative arrangement to that of FIG. 10, in which the third actuator is replaced by a simple hydraulic connection 190 direct to the control valve 170. The hydraulic connection 190, together with the control valve 170, form a flow metering system that can directly control the volume of hydraulic fluid in actuators 40 and 50.

In these examples, the third actuator 130 alone or in combination with any or all of the control valve 170, the hydraulic link element 120, and the connection 110, or alternatively the control valve 170 and the connection 190, form a hydraulic control device 200.

Figure 11:
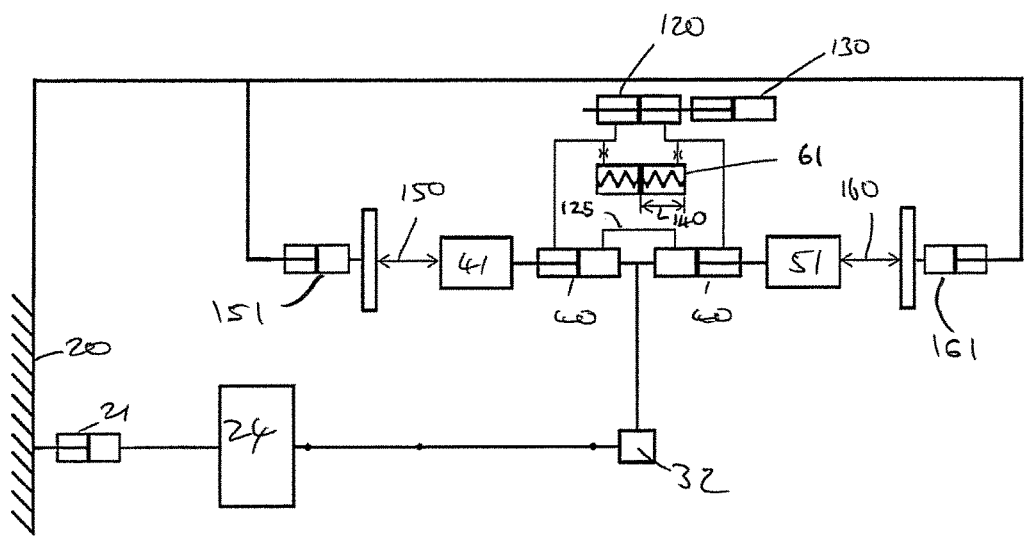
FIG. 11 shows a schematic mechanical system representation of a combined hydraulically linked suspension and wing control system.

FIG. 11 shows an example of an embodiment wherein the boom wing suspension system and the boom wing positioning system are combined to provide a complete hydraulic active suspension system. The spring target distance 140 term required for active roll calculations is available by measuring the deflection occurring in the hydraulically-linked suspension device.

In such an embodiment, the hydraulic link element, controlled by a control system linked to the third actuator 130 determines the neutral position of the two boom wings 41, 51. The biasing link element 61, which is connected in parallel to the hydraulic link element 125, allows the boom wings to be deflected from the precise position defined by the control system under the input of a sudden disturbance.

Figure 13:
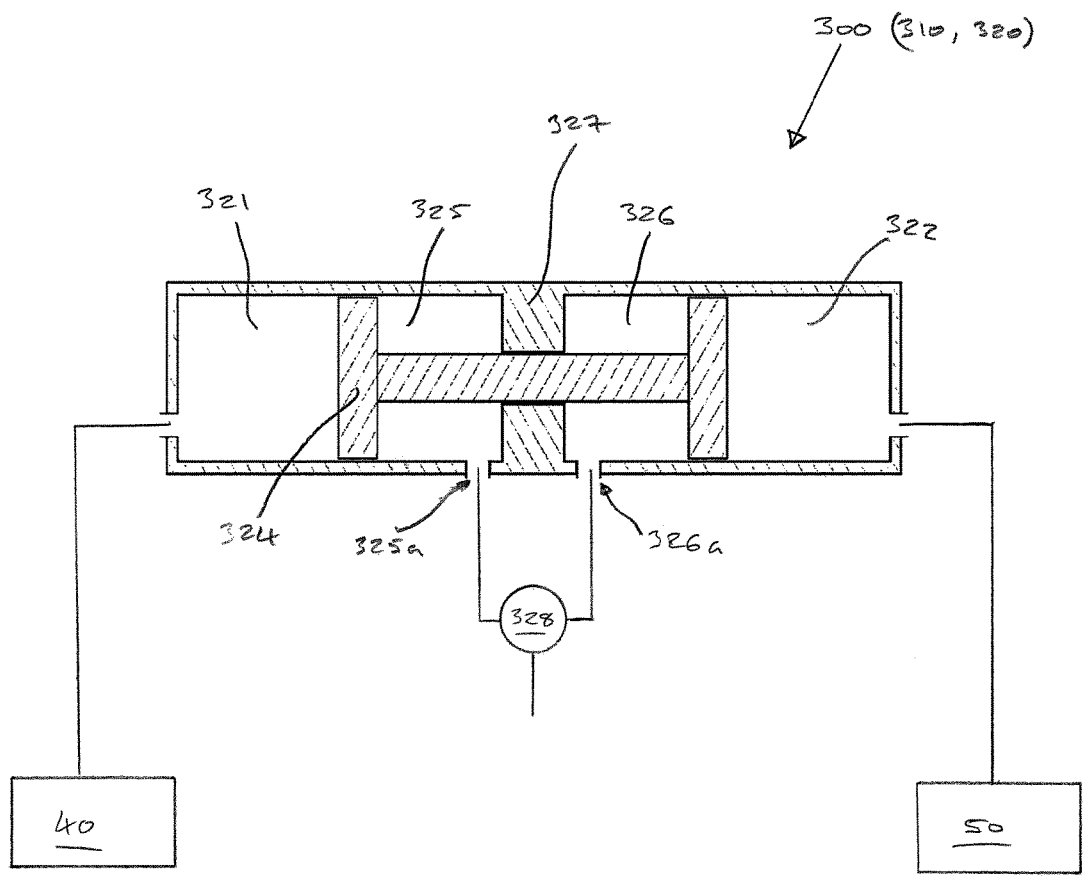
FIG. 13 shows a simplified cross-sectional view of an integral hydraulic link and drive unit, which may comprise a part of a position control system according to the present invention.

Referring to FIG. 13, an integral hydraulic link and drive unit 300 comprises a hydraulic link element 310 and a hydraulic drive element 320. The hydraulic link element 310 comprises two link chambers 321, 322, for connection to the respective front chambers 44, 54 (not shown) of the hydraulic actuators 40, 50 of the positioning system. In this exemplary embodiment the unit 300 is generally cylindrical and the link chambers 321, 322 are located at end portions of the unit 300. The link chambers 321, 322 are separated by a movable element 324, in this example a dumbbell-shaped piston which lies along the longitudinal axis of the cylindrical body of the unit 300. The position of the movable element 324 determines the volume of each of the link chambers 321, 322 and thereby the extension/retraction of the hydraulic actuators 40, 50, as has been described hereinabove.

The hydraulic drive element (320) of the unit 300 comprises two drive chambers 325, 326 which are located at a mid-portion of the unit 300 such that each of the drive chambers 325, 326 is adjacent one of the link chambers 321, 322. The drive chambers 325, 326 are separated from each other by a partition wall 327 and a portion of the movable element 324, which extends through the partition wall 327 such as to be in sliding relationship with the body of the unit 300. Each of the drive chambers 325, 326 is separated from its respective adjacent link chamber 321, 322 by an end of the dumbbell-shaped movable element 324. Each of the drive chambers 325, 326 comprises an inlet/outlet port 325a, 326a which is connected to a position control valve 328. The position control valve 328 may be similar to the control valve 170 of FIG. 10a.

In use, a pressurised hydraulic fluid is provided, via the position control valve 328, to one of the drive chambers 325, 326 and exerts a force on the movable element 324, thereby causing the movable element 324 to slide along the axis of the unit 300. For example, referring again to FIG. 13, the hydraulic fluid is fed to the left hand drive chamber 325 such that the movable element 324 is driven to the left. As the movable element 324 travels along the axis, the volume of the left hand drive chamber 325 increases while the volume of the left hand link chamber 321 reduces. Accordingly, a hydraulic fluid in the left hand link chamber 321 is displaced and a portion of that hydraulic fluid is forced out of the link chamber 321 to the front chamber 44 of the corresponding hydraulic actuator 40, thereby moving the actuator 40.

The first and second hydraulic actuators 40, 50 may be connected by a second hydraulic link, as has been described hereinabove. In that case, as the movable element 324 moves to the left, displacing the fluid from the link chamber 321 to the front chamber 41 of the first actuator 40, the volume of the other link chamber 322 is increased (the total volume of the link chambers 321, 322 being constant), allowing fluid from the first actuator 40 to enter, allowing the first actuator 40 to change in extension.

Of course, if the hydraulic fluid is instead fed from the positioning control valve 328 to the right hand drive chamber 326, then in a similar manner the movable element 324 will be driven to the right, causing a hydraulic fluid to be pushed out of the right hand link chamber 322 toward the front chamber 54 of the corresponding hydraulic actuator 50, so as to move that actuator 50. Furthermore, if the first and second hydraulic actuators are connected by a second hydraulic link, as the movable element 324 moves to the right, displacing the fluid from the link chamber 322 to the front chamber 51 of the second actuator 50, the volume of the other link chamber 321 is increased (the total volume of the link chambers 321, 322 being constant), allowing fluid from the second actuator 50 to enter, allowing the second actuator 50 to change in extension.

Thus it will be understood that the integral hydraulic link and drive unit 300 is able to perform the same positioning control function which is offered by the hydraulic-link-and-third-actuator arrangements which have been described hereinabove, for example in connection with FIG. 7. Accordingly the unit 300 may be used in the described positioning systems instead of a hydraulic-link-and-third-actuator arrangement. The unit 300 offers the advantage that the "third actuator" and the hydraulic link may be conveniently integrated into a single component.

In an alternative embodiment, the positions of the link chambers 321, 322 and drive chambers 325, 326 are reversed (along with their respective connections to the actuators 40, 50 and the position control valve 328). That is, in the sense of FIG. 13, the link chambers 321, 322 are located in the mid-portion of the unit 300 while the drive chambers 325, 326 are located at the end portions of the unit 300. Thus the link chambers 321, 322 and drive chambers 325, 326 are "interchangeable", possibly allowing more convenient connection to the actuators 40, 50 and the position control valve 328 of the positioning system on the vehicle.

The following are some preferred aspects relating to the present disclosure:

Clause 1. A suspension system for a boom having right and left boom wings, the system comprising: a first actuator for moving the right boom wing relative to a support frame; a second actuator for moving the left boom wing relative to a support frame; and a hydraulic link between the actuators such that as one actuator extends, the other retracts.

Clause 2. The suspension system of Clause 1, wherein the right and left boom wings are biased towards a neutral position.

Clause 3. The suspension system of Clause 2, wherein the right and left wings are biased towards a neutral position using a biasing link element that forms part of the hydraulic link.

Clause 4. The suspension system of Clause 2 or 3, wherein the biasing link element comprises a first and a second chamber separated by a mechanical element, wherein the first and second chambers are linked to the right and left actuators respectively, such that the position of the mechanical element is linked to the extension and retraction of the right and left actuators.

Clause 5. The suspension system of Clause 4, wherein the biasing link element comprises a biasing element which biases the mechanical element towards a position corresponding to the actuators being in a neutral position, whilst also allowing the actuators to move into a non-neutral position under the influence of a sudden force.

Clause 6. The suspension system of Clause 5, wherein the biasing element is wound or compressed by a rotary actuator.

Clause 7. The suspension system of Clause 5 or 6, wherein the biasing element is a spring centring element.

Clause 8. The suspension system of any of Clauses 1 to 7, wherein the two actuators are linked by a second hydraulic link, such that as one actuator extends, the other retracts.

Clause 9. The suspension system of any of Clauses 1 to 8, wherein the suspension system is integrated into a left and right wing position control circuit, such both of the right and left actuators may be extended or retracted independently of the other.

Clause 10. The suspension system of any of Clauses 1 to 9, wherein the left and right actuators are linear actuators.

Clause 11. The suspension system of any of Clauses 1 to 10, wherein the left and right actuators are rotary actuators.

Clause 12. The suspension system of any of Clauses 5 to 11, wherein the neutral position is one where the forces due to the biasing element and hydraulic pressure are in equilibrium.

Clause 13. The suspension system of any of Clauses 1 to 12, wherein the boom is mounted on a vehicle; and the first and second actuators rotate the boom wings around axes substantially parallel to the direction of travel of the vehicle.

Clause 14. The suspension system of any of Clauses 1 to 13, wherein the boom is mounted on a vehicle; and the first and second actuators rotate the boom wings around axes which are substantially vertical when the vehicle is on flat ground.

Clause 15. A positioning system as described hereinabove may comprise a suspension system according to any of Clauses 1 to 13, the suspension system being integrated into a left and right wing position control circuit, such that both of the right and left actuators may be extended or retracted independently of the other.

The invention claimed is:

1. A positioning system for a boom having right and left boom arms, the positioning system comprising:
   a first actuator for moving the right boom arm relative to a support frame;
   a second actuator for moving the left boom arm relative to the support frame;
   a first hydraulic link between the first and second actuators; and
   a hydraulic control device for controlling movement of hydraulic fluid within the first hydraulic link
   the hydraulic control device comprising a hydraulic drive comprising a moveable element having first and second ends coupled by a connecting portion, the connecting portion extending through a partition wall of the hydraulic drive to allow the moveable element to slide relative to the partition wall within the hydraulic drive,
   wherein first and second drive chambers are formed between the partition wall and respective ones of the first and second ends of the moveable element, and first and second link chambers are formed between the respective ones of the first and second ends of the moveable element and respective end portions of the hydraulic drive,
   wherein the hydraulic fluid provided to one of the first and second drive chambers causes a movement of the movable element, so as to provide the displacement of the hydraulic fluid in one of the first and second link chambers, to thereby control a position of the first and second actuators.

2. A positioning system according to claim 1, wherein the boom is subject to a first input disturbance defined by a roll/yaw input, and a second input disturbance defined by a linear input, and the positioning system manages the first input disturbance separate from the second input disturbance.

3. A positioning system according to claim 2, wherein:
   the first and second link chambers are linked to the first and second actuators respectively, such that the position of the movable element controls the position of the first and second actuators.

4. A positioning system according to claim 3, wherein the hydraulic drive comprises a third actuator which is mechanically linked to the movable element.

5. A positioning system according to claim 4, wherein the third actuator forms a part of a rotary hydraulic system.

6. A positioning system according to claim 1, wherein the position of the first and second actuators is one of an extension and a retraction, and wherein the first and second actuators are linked by a second hydraulic link, such that as one actuator extends, the other retracts.

7. A positioning system according to claim 1, wherein the first and second actuators are linear actuators.

8. A positioning system according to claim 1, wherein the first and second actuators are rotary actuators.

9. A positioning system according to claim 1, wherein:
   the boom is mounted on a vehicle and the first and second actuators rotate the right and left boom arms respectively around an axis that is substantially parallel to a direction of travel of the vehicle.

10. A positioning system according to claim 1, wherein:
    the boom is mounted on a vehicle and the first and second actuators rotate the right and left boom arms respectively around an axis that is substantially vertical when the vehicle is on flat ground.

11. A positioning system according to claim 3, wherein the first hydraulic link comprises a hydraulic link element which is arranged in parallel with the hydraulic drive, such as to allow the first and second actuators to move under the influence of a sudden force, without movement of the movable element.

12. A positioning system according to claim 11, wherein:
    the hydraulic link element comprises third and fourth link chambers which are separated by a mechanical element, the third link chamber being linked to the first link chamber and to the first actuator, the fourth link chamber being linked to the second link chamber and to the second actuator; and
    the hydraulic link element comprises a biasing element which biases the mechanical element towards a neutral position.

13. A positioning system according to claim 1, wherein the hydraulic drive comprises a flow metering system which is connected to the first hydraulic link.

14. A boom sprayer having right and left boom arms and a positioning system, the position system comprising:
    a first actuator for moving the right boom arm relative to a support frame;
    a second actuator for moving the left boom arm relative to the support frame;
    a first hydraulic link between the first and second actuators; and
    a hydraulic control device for controlling movement of hydraulic fluid within the first hydraulic link
    the hydraulic control device comprising a hydraulic drive comprising a moveable element having first and second ends coupled by a connecting portion, the connecting portion extending through a partition wall of the hydraulic drive to allow the moveable element to slide relative to the partition wall within the hydraulic drive,
    wherein first and second drive chambers are formed between the partition wall and respective ones of the first and second ends of the moveable element, and first and second link chambers are formed between the respective ones of the first and second ends of the moveable element and respective end portions of the hydraulic drive, wherein the hydraulic fluid provided to one of the first and second drive chambers causes a movement of the movable element, so as to provide the displacement of the hydraulic fluid in one of the first and second link chambers, to thereby control a position of the first and second actuators.

15. The boom sprayer according to claim 14, wherein the boom sprayer is subject to a first input disturbance defined by a roll/yaw input, and a second input disturbance defined by a linear input, and the positioning system manages the first input disturbance separate from the second input disturbance.

16. The boom sprayer according to claim 15, wherein:
the first and second link chambers are linked to the first and second actuators respectively, such that the position of the movable element controls the position of the first and second actuators.

17. The boom sprayer according to claim 14, wherein the boom sprayer is mounted on a vehicle, and the position of the first and second actuators is one of an extension and a retraction, and the first and second actuators rotate the right and left boom arms respectively around an axis that is substantially parallel to the direction of travel of the vehicle.

18. The boom sprayer according to claim 16, wherein the first hydraulic link comprises a hydraulic link element which is arranged in parallel with the hydraulic drive, such as to allow the first and second actuators to move under the influence of a sudden force, without movement of the movable element.

* * * * *